No. 878,997. PATENTED FEB. 11, 1908.
D. W. PAYNE.
APPARATUS FOR TEMPERING CREAM AND OTHER LIQUIDS.
APPLICATION FILED APR. 5, 1907.

4 SHEETS—SHEET 2.

WITNESSES
J. Jensen
H. A. Kilgore

INVENTOR.
DARIUS W. PAYNE.
BY Williamson Merchant
ATTORNEYS.

No. 878,997. PATENTED FEB. 11, 1908.
D. W. PAYNE.
APPARATUS FOR TEMPERING CREAM AND OTHER LIQUIDS.
APPLICATION FILED APR. 5, 1907.
4 SHEETS—SHEET 3.

FIG. 4.

WITNESSES
J. Jessen
H. D. Kilgore

INVENTOR
DARIUS W. PAYNE.
BY Williamson Merchant
ATTORNEYS.

No. 878,997.  PATENTED FEB. 11, 1908.
D. W. PAYNE.
APPARATUS FOR TEMPERING CREAM AND OTHER LIQUIDS.
APPLICATION FILED APR. 5, 1907.

4 SHEETS—SHEET 4.

WITNESSES
J. Jensen
H. D. Kilgore

INVENTOR
DARIUS W. PAYNE
BY Williamson Merchant ATTORNEYS

UNITED STATES PATENT OFFICE.

DARIUS W. PAYNE, OF MINNEAPOLIS, MINNESOTA.

APPARATUS FOR TEMPERING CREAM AND OTHER LIQUIDS.

No. 878,997.  Specification of Letters Patent.  Patented Feb. 11, 1908.

Application filed April 5, 1907. Serial No. 366,531.

*To all whom it may concern:*

Be it known that I, DARIUS W. PAYNE, a citizen of the United States, residing at Minneapolis, in the county of Hennepin and State of Minnesota, have invented certain new and useful Improvements in Apparatus for Tempering Cream and other Liquids; and I do hereby declare the following to be a full, clear, and exact description of the invention, such as will enable others skilled in the art to which it appertains to make and use the same.

My present invention has for its especial object to provide an improved apparatus for pasteurizing or sterilizing cream, milk and liquids of like description, but is capable of many other uses and broadly considered is a device for tempering liquids.

The invention consists of the novel devices and combinations of devices hereinafter described and defined in the claims.

In the accompanying drawings which illustrate the invention, like characters indicate like parts throughout the several views.

Figure 1:
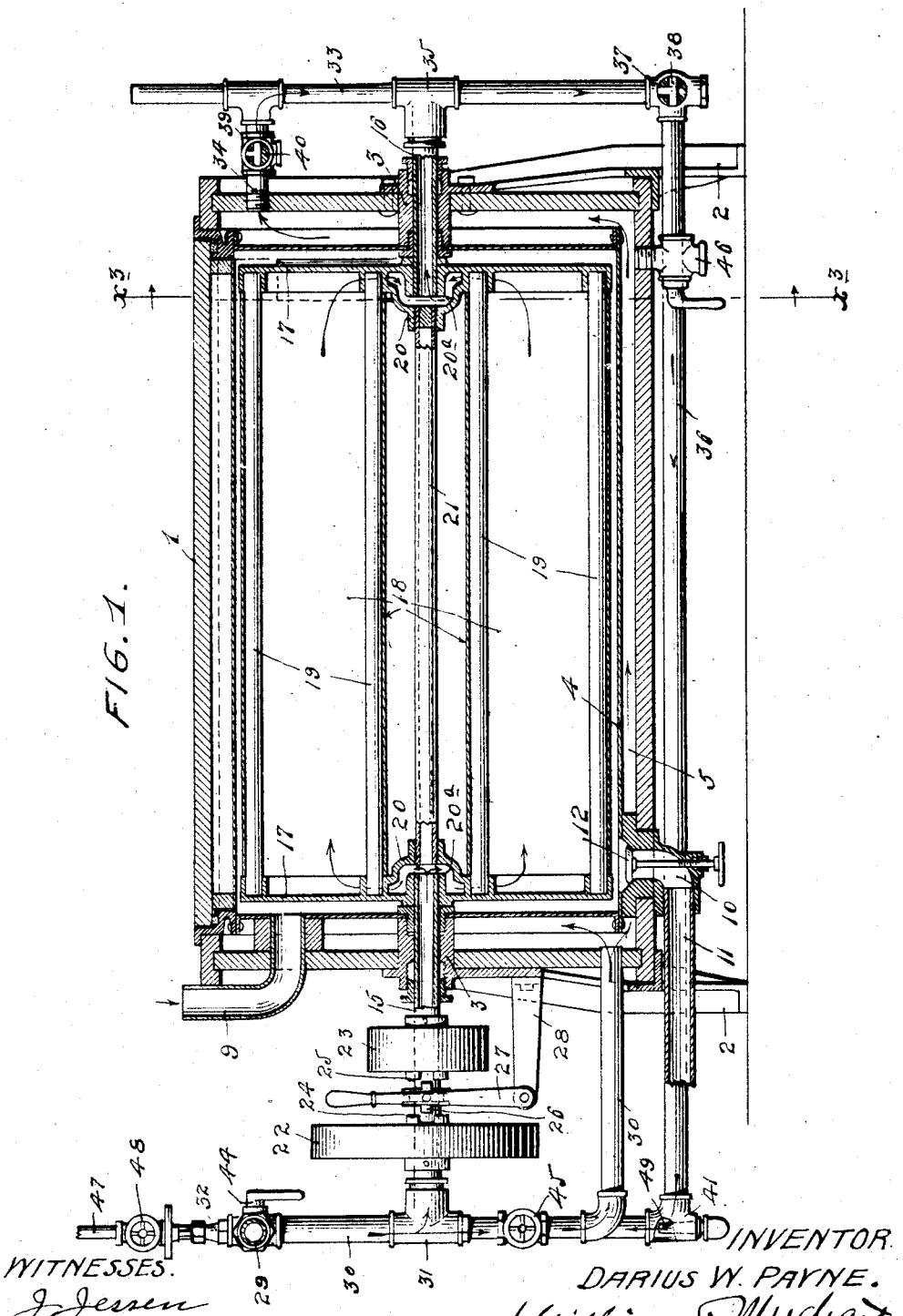
Figure 2:
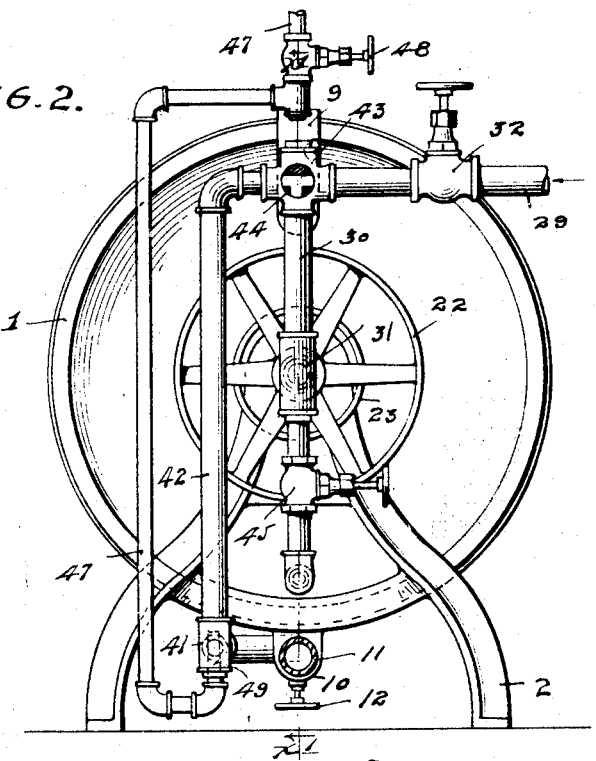
Figure 3:
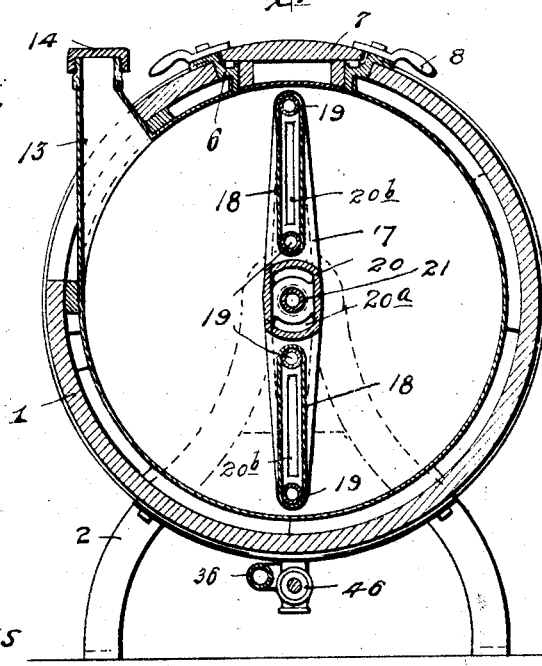
Figure 5:
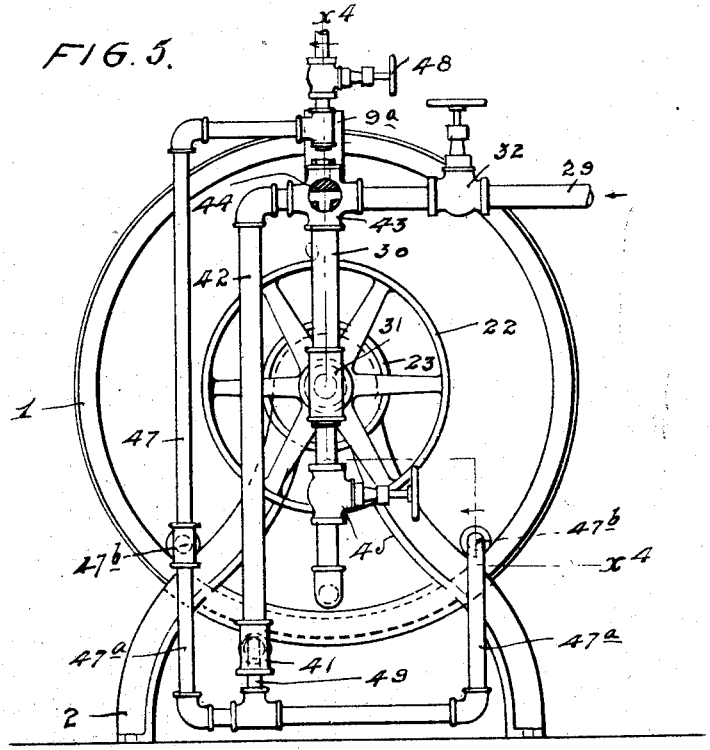
Figure 6:
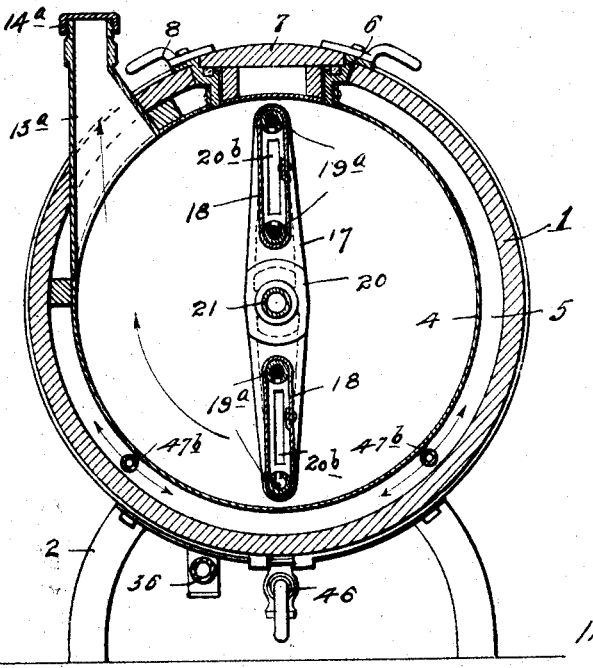

Referring to the drawings, Figure 1 is a view partly in elevation but principally in vertical section on the line $x^1 x^1$ of Fig. 2, showing the tempering apparatus. Fig. 2 is an end elevation of the said apparatus. Fig. 3 is a transverse vertical section taken on the line $x^3 x^3$ of Fig. 1. Fig. 4 is a view partly in elevation, but principally in vertical section, on the irregular line $x^4 x^4$ of Fig. 5, illustrating a slightly modified form of the tempering apparatus. Fig. 5 is a left end elevation of the apparatus shown in Fig. 4; and Fig. 6 is a transverse vertical section taken on the line $x^6 x^6$ of Fig. 4.

Considering first the specific form of apparatus illustrated in Figs. 1 to 3 inclusive, the numeral 1 indicates a horizontally disposed cylindrical drum which is rigidly supported at its ends by pedestal brackets 2 having sleeves or bearing hubs 3 that project axially into said drum through the heads thereof. Fixedly secured within the drum 1, but spaced apart from the heads and periphery thereof, is an inner drum or shell 4 between which two drums 1 and 4 a thin water compartment 5 is formed. The outer drum 1 is preferably constructed of wood, while the inner drum or shell is preferably constructed of galvanized sheet metal.

The tempering compartment proper is within the inner drum 4 and to afford access to this compartment, a long door opening is provided in the top thereof. This door opening, as shown, is formed through a rectangular frame 6 that forms tight joints with the two drums 1 and 4 and which affords a seat for a displaceable door 7, which door, as shown, is adapted to be held in a closed position by pivoted lock levers 8. The cream or other liquid to be sterilized or otherwise tempered is adapted to be introduced into the chamber within the inner drum 4 through a supply pipe 9, and it is adapted to be drawn off from the bottom of said chamber through a valve casing 10 and discharge pipe 11. The passage through the casing 10 is normally closed by a valve 12. An upwardly extended tangential discharge neck 13 opens from the interior of the inner drum 4, preferably near the right hand end thereof. Under certain conditions hereinafter noted, this discharge neck 13 should be closed by a cap 14.

Extending through and journaled in the left hand bearing sleeve or hub 3 is a tubular shaft 15; and extending through the right hand bearing sleeve or hub 3 is a rotary pipe or tube 16. Rigidly secured to the inner end of the tubular shafts 15 and 16 are diametrically extended head brackets 17. These two heads 17 carry a pair of hollow paddle blades 18 preferably constructed of thin sheet metal formed quite flat and thin in cross section and located in the same plane with each other on the opposite sides of the axis of the rotary reel made up of the said parts 17 and 18. Spacing pipes 19 are preferably placed within the hollow blades 18 and are seated at their ends in the heads 17, thereby rigidly connecting the said heads and stiffening the said hollow blades. The heads 17 are formed with hollow hub portions 20 that are connected by a pipe or tube 21, the right hand end of which is preferably plugged or closed. The hollow hubs 20 are provided with ports $20^a$ that communicate through ports $20^b$ with the interiors of the hollow blades 18. The tubular shaft 15 opens directly into the left hand port $20^a$, while the right hand tubular shaft 16 opens directly from the right hand port $20^a$.

Journaled on the tubular shaft 16 but held against sliding movements thereon, are preferably two driving pulleys 22 and 23 that are provided with half clutches 24 and 25 on their opposing hub portions.

The numeral 26 indicates a clutch member that is mounted to slide on but caused to rotate with the tubular shaft 15, and is provided at its opposite faces with teeth arranged to engage with the said half clutches 24 and 25. Said clutch member 26 is moved by a shipper lever 27, shown as pivoted to an arm 28 on the left hand pedestal bracket 2.

Power driven belts, (not shown) will run over the two loose pulleys 22 and 23. As is evident, when the small pulley 23 is coupled to the hollow shaft 15 by the clutch member 26, the reel made up of the heads 17 and hollow blades 18 will be rotated at a much higher speed than when the said large pulley 22 is coupled to said shaft 15.

The water circulating connections to the apparatus are as follows: A water supply pipe 29 leads from a suitable source of water supply, such as an elevated water tank, and extends to a depending pipe 30. The pipe 30 leads into the lower portion of the water chamber formed between the two drums 1 and 4, and at its intermediate portion it is provided with a T 31 in which the outer end of the tubular shaft 15 is shown as journaled. The supply pipe 29 is preferably provided with a valve 32. At the other end of the machine, to-wit, as shown in Fig. 1, at the right hand end thereof, is an upright pipe 33 that is open at its upper end. A branch pipe 34 connects the upper right hand portion of the water chamber 5 with the upper portion of the pipe 33. At its intermediate portion, said pipe 33 is provided with a T 35 in which the outer end of the tubular shaft 16 is journaled. A horizontal water return pipe 36 is connected to the lower end of the pipe 33 by a T-coupling 37 in which is a three-way valve 38. The T-coupling 39 in which is a three-way valve 40 is interposed in the pipe 34. The forward end of the pipe 36 is connected by an elbow 41 to an upright return pipe 42. A T-coupling 43 connects the ends of the pipes 29, 30 and 42. In this coupling 43 is a three-way valve 44.

The numeral 45 indicates a valve interposed in the pipe 30 below the coupling 31.

The numeral 46 indicates a drain cock which opens from the lower portion of the water chamber 5 through the bottom of the outer drum 1.

Steam is supplied for the purpose of heating the water and for producing a forced circulation thereof through the water pipes and other connections described and including, of course, the water chamber 5. As shown, the steam is supplied from the pipe 47 that leads from a suitable source of steam supply (not shown), is provided with a valve 48 and terminates in the contracted nozzle 49, which nozzle, as shown, extends through and terminates in the elbow coupling 41 and stands in such position that steam discharged therefrom will not only heat the water in the pipe 42 but will force the same upward. Of course, if desired, the said steam pipe 47 might be provided with several discharge nozzles located at different points within the water circulating pipes.

Operation. When the apparatus is to be used as a pasteurizer, sterilizer, or more generally stated, for the purpose of heating a liquid contained within the inner drum 4, the three-way valves 44, 40 and 38 should be set in the position shown in Figs. 1 and 2. The water which is heated and set in motion within the pipe 42, by the discharge of steam from the nozzle 49 will be forced downward through the pipe 30 and will pass in part into the water chamber 5 and in part through the hollow shaft 15, into the port 20ª of the left hand reel bracket or head 17. From the said port 20ª the water passes through the ports 20ᵇ into the hollow blades 18, and from thence through the ports 20ᵇ and 20ª of the right hand reel bracket or head 17; and from thence through the hollow shaft 16 into the vertical pipe 33. The water introduced into the left hand end of the water chamber 5 passes through said chamber and around the inner drum 4, and from thence through the branch pipe 34 into the vertical return pipe 33. From the pipe 33, the water is returned by the pipe 36 to the lower end of the vertical pipe 42, where it is again subjected to steam from the nozzle 49 and is thereby again reheated and given further movement in the direction already indicated. It will thus be seen that the cream or other liquid contained within the drum 4 will be heated not only from contact with the hot surface of the said drum 4, but also by contact with the hot surfaces of the hollow blades and heads of the rotating reel. This reel also thoroughly stirs the cream or other liquid being tempered, and thereby insures perfectly even tempering or heating thereof.

For many purposes, and especially where complete pasteurization or sterilization is required, such as when sterilizing cream in the ripening process, it will usually be desirable to confine the body of cream within the inner drum 4. When this is the desired action, the cap 14 is placed on the discharge neck 13, the valve 12 is closed, and the reel is then preferably rotated at a slow speed. For many other purposes, however, it will be found desirable to continuously circulate the cream or other liquid being heated through the chamber within the inner drum 4. When this is the desired action, the cap should be removed from the discharge neck 13, the reel should be rotated at its high speed, and the valve 12 should, of course, be kept closed. When the reel is thus rotated at a high speed, centrifugal force will spread the cream out in a thin layer against the inner surface of the drum 4 and will discharge cream or other liquid from the drum 4 through the discharge neck 13, from which neck it may be conveyed by a hose or suitable tube, not shown, to some suitable receptacle therefor. When the apparatus is to be used as a cooling apparatus, the steam should, of course, be shut off, and cool water should be allowed to run through the water conveying connections described. In this instance, however, the three-way valve 44 should be given a one-fourth rotation in a direction reverse to the movements of the hands of a watch, so as to cut off the pipe 42 while opening the pipe 29 to pipe 30. The three-way valve 40 should be given a one-half rotation, so as to open the depending arm of the T-coupling 39 to exhaust. The three-way valve 38 should be given a one-fourth rotation in a direction reverse to that of the movements of the hands of a watch, so as to open the depending arm of the T-coupling 37 to exhaust. With the said valves 38 and 40 moved as just noted, the water, after passing through the chamber 5 and the connections including the reel, and after having been warmed or heated, will be exhausted or run off from the couplings 37 and 39.

The construction illustrated in Figs. 4, 5 and 6 is the same as that already described, with the following exceptions: The tangential discharge neck 13$^a$, in this arrangement, is located at and extends upward from the central portion of the drum 4, and is provided with a displaceable cap 14$^a$. An inlet tube 9$^a$ for the cream or other liquid to be tempered opens into each end of the drum 4. This arrangement is especially adapted for large machines where very high capacity is required and where it is desirable to have a continuous flow of cream or other liquid through the inner drum or tempering chamber. Also in this modified construction, the left hand reel head or bracket 17 is shown as provided with a long port 20$^c$ that opens directly into the ends of the head spacing pipes 19, and the said pipes are provided with lateral perforations 19$^a$ that open directly into the chambers of the hollow reel blades 18. Also as shown, the steam supply pipe 47 is provided with branch pipes 47$^a$ that open into the water compartment 5 between the two drums 1 and 4 and terminate in perforated nozzle sections 47$^d$. As is evident, steam discharged from the nozzle pipes 47$^d$, will very rapidly heat the water contained in the compartment 5.

In the apparatus shown in Figs. 4, 5 and 6, the cream is fed into both ends of the tempering chamber and under the action of the rotary reel is spread out over the inner surface of the cylindrical portion of said tempering chamber and forced to and out of the centrally located discharge neck or passage as fast as it is fed into said tempering chamber through the two inlet passages.

What I claim is:

1. The combination with a drum or receptacle, of a reel rotatively mounted therein and having hollow flat, radially disposed paddle blades, and connections for circulating a tempering fluid through the hollow blades of said reel, while the said reel is being rotated, substantially as described.

2. The combination with a drum or receptacle, of a reel rotatively mounted upon an approximately horizontal axis within said drum, and provided with hollow heads and hollow, flat, radially disposed paddle blades, and means for circulating a tempering fluid through said reel while under rotation, comprising hollow shafts or sleeves extended axially into the heads of said reel, substantially as described.

3. The combination with an approximately horizontal drum with inlet and outlet passages for the liquid to be tempered, of a reel having hollow heads and paddle blades mounted on an approximately horizontal axis within said drum, hollow pipes or sleeves extending through the heads of said drum into the heads of said reel, one thereof being secured to the adjacent head of said reel and having means for rotating it, and steam and water supply pipes with connections for circulating hot water through said reel, substantially as described.

4. The combination with approximately concentric inner and outer drums and means for circulating water through the chamber formed between the same, of a reel having hollow heads and paddle blades rotatively mounted within the inner of said drums, and means for circulating water through said reel while it is under rotation, substantially as described.

5. The combination with approximately concentric inner and outer drums and means for circulating water through the chamber formed between the same, of a reel having hollow heads and radially disposed hollow paddle blades, rotatively mounted within said inner drum and having axial sleeves or hollow shafts extended outward through the heads of said drums, and connections for circulating water through said reel shafts, heads and blades, while said reel is under rotation, substantially as described.

6. The combination with a drum having a peripheral outlet passage and an inlet passage located nearer to the axis of said drum, of a rotative reel or agitator working within said drum and provided with hollow paddle blades, and connections for circulating the tempering fluid through the blades of said reel, while under rotation, substantially as described.

7. The combination with approximately concentric inner and outer drums, the former having inlet and outlet passages for the liquid to be tempered, of a reel having hollow paddle blades and heads rotatively mounted within said inner drum and provided with axial hollow shafts or sleeves projecting outward through the heads of both drums, means for rotating said reel through one of its projecting hollow shafts, and means for circulating the tempering fluid through the hollow parts of said reel and through the chamber formed between said two drums, substantially as described.

8. The combination with approximately horizontal and concentric fixed drums, the inner thereof having inlet and outlet passages for the liquid to be tempered, of a reel having hollow heads, hollow radially extended paddle blades connecting said heads and hollow shafts extending axially outward from said reel heads through both heads of said drums, a pulley or wheel on one of said reel shafts for rotating said reel, and connections for circulating the tempering fluid through the hollow parts of said reel and through the chamber formed between said two drums, substantially as described.

9. The combination with a drum or receptacle for the liquid to be tempered, of a horizontal reel having hollow heads and hollow, flat, radially disposed paddle blades, said reel having hollow shafts that project through the heads of said drum, and one of which shafts is provided with a pulley or wheel for rotating the same, substantially as described.

10. The combination with a drum or receptacle for the liquid to be tempered, of a reel rotatively mounted therein and comprising a pair of laterally spaced hollow heads having hollow trunnions or shafts projecting through the heads of said drum, hollow paddle blades connecting the heads of said reel, and spacing tubes connecting said reel heads and reinforcing the hollow blades, thereof, substantially as described.

11. The combination with a drum or receptacle having a peripheral discharge passage opening from the intermediate portion thereof and having inlet passages opening into the ends thereof, of a reel or agitator rotatively mounted within said drum, substantially as described.

12. The combination with inner and outer approximately horizontal fixed drums, the said inner drum having an intermediate peripheral discharge passage and inlet passages opening into both ends thereof, of a reel rotatively mounted in said inner drum and having hollow heads, blades and shafts, of means for rotating said reel, and pipe connections for circulating the tempering fluid through the hollow parts of said reel and through the chamber formed between the said two drums, substantially as described.

13. The combination with a drum provided with a surrounding tempering chamber and connections for circulating a tempering fluid through said tempering chamber, said drum having a peripheral outlet passage and an inlet passage, located nearer to its axis, of a reel or agitator working within said drum, and means for rotating said reel at a proper speed to discharge the tempered liquid from said drum through the peripheral outlet passage thereof, substantially as described.

14. The combination with inner and outer approximately horizontal fixed drums, the inner thereof affording a tempering chamber and having suitable inlet and outlet passages, a rotary reel or agitator comprising hollow heads and hollow, flat, radially disposed blades, working in said tempering chamber, and a steam supply pipe leading into the water chamber formed between the said two drums, substantially as described.

In testimony whereof I affix my signature in presence of two witnesses.

DARIUS W. PAYNE.

Witnesses:
 MALIE HOEL,
 F. D. MERCHANT.